(12) United States Patent
Dierickx et al.

(10) Patent No.: US 10,616,521 B2
(45) Date of Patent: Apr. 7, 2020

(54) IMAGING DEVICE FOR DETECTING SPARSE EVENT INFORMATION IN A PIXEL ARRAY

(71) Applicant: Caeleste CVBA, Mechelen (BE)

(72) Inventors: Bart Dierickx, Edegem (BE); Nick Witvrouwen, Arendonk (BE); Bert Luyssaert, Ghent (BE); Gaozhan Cai, Antwerp (BE); Robert Bilhorn, San Diego, CA (US)

(73) Assignee: CAELESTE CVBA, Mechelen (BE)

( * ) Notice: Subject to any disclaimer, the term of this patent is extended or adjusted under 35 U.S.C. 154(b) by 34 days.

(21) Appl. No.: 14/688,085

(22) Filed: Apr. 16, 2015

(65) Prior Publication Data

US 2016/0309105 A1 Oct. 20, 2016

(51) Int. Cl.
*H04N 5/378* (2011.01)
*H04N 5/351* (2011.01)
*H04N 5/232* (2006.01)
*H04N 5/3745* (2011.01)

(52) U.S. Cl.
CPC ......... *H04N 5/378* (2013.01); *H04N 5/23245* (2013.01); *H04N 5/351* (2013.01); *H04N 5/3745* (2013.01)

(58) Field of Classification Search
CPC ...... H04N 5/378; H04N 5/3745; H04N 5/351; H04N 5/23245
See application file for complete search history.

(56) References Cited

U.S. PATENT DOCUMENTS

| 5,010,245 | A  | * | 4/1991 | Dierikx ................ | H04N 5/335 250/206.2 |
| 5,107,122 | A  | * | 4/1992 | Barkan ................ | G01T 1/2928 250/370.01 |
| 2002/0106129 | A1 | * | 8/2002 | Yadid-Pecht .......... | H04N 3/155 382/232 |
| 2002/0145115 | A1 | * | 10/2002 | Nygard ................ | H04N 3/1562 250/370.09 |
| 2005/0111696 | A1 | * | 5/2005 | Baer ................... | H04N 7/188 382/103 |
| 2005/0116139 | A1 | * | 6/2005 | Mikkelsen ........... | H04N 3/1562 250/208.1 |
| 2008/0106622 | A1 | * | 5/2008 | Turchetta ............. | H04N 3/155 348/294 |
| 2010/0213353 | A1 |   | 8/2010 | Dierickx |  |
| 2011/0210235 | A1 | * | 9/2011 | Dierickx ............... | G01T 1/17 250/214 R |
| 2014/0226043 | A1 | * | 8/2014 | Chinn ................ | H04N 5/2258 348/262 |

(Continued)

OTHER PUBLICATIONS

Gabrielli, "Fast Readout Architectures for Large Arrays of Digital Pixels: Examples and Applications," Scientific World Journal, article ID 523429, 2014. (Year: 2014).*

*Primary Examiner* — Twyler L Haskins
*Assistant Examiner* — Akshay Trehan
(74) *Attorney, Agent, or Firm* — Workman Nydegger

(57) ABSTRACT

An imaging system for detecting one or more events in a pixel array. The imaging system comprises the pixel array and a processing area adjacent to the pixel array. The imaging system is configured to transfer the pixel information of a subgroup of pixels to the processing area and the processing area is configured to process the event information.

12 Claims, 10 Drawing Sheets

(56) References Cited

U.S. PATENT DOCUMENTS

2014/0361916 A1* 12/2014 Wolfs ................... H03M 1/185
 341/155
2015/0365617 A1* 12/2015 Chen .................... H04N 5/3745
 348/302

* cited by examiner

| threshold | Hits (binary 1s) | center of gravity of binary data | | |
|---|---|---|---|---|
| | | x | y | error |
| 1 | 50 | 0.237 | -0.237 | 0.019 |
| 2 | 40 | 0.194 | -0.194 | 0.079 |
| 4 | 30 | 0.240 | -0.240 | 0.014 |
| 8 | 24 | 0.200 | -0.200 | 0.071 |
| 10 | 20 | 0.243 | -0.243 | 0.010 |
| 15 | 16 | 0.250 | -0.250 | 0.000 |
| 20 | 12 | 0.125 | -0.125 | 0.177 |
| 21 | 8 | 0.125 | -0.125 | 0.177 |
| 22 | 5 | 0.167 | -0.167 | 0.118 |
| 23 | 3 | 0.333 | -0.333 | 0.118 |
| 24 | 1 | 0.000 | 0.000 | 0.354 |

FIG. 19

IMAGING DEVICE FOR DETECTING SPARSE EVENT INFORMATION IN A PIXEL ARRAY

FIELD OF THE INVENTION

The present invention relates to the field of imaging systems. More specifically it relates to methods and systems for reading out images with sparse information.

BACKGROUND OF THE INVENTION

Images with sparse information are images where electromagnetic radiation or particle radiation is only impacting on a limited number of pixels on an imaging system, leaving a dark background (no radiation) for the remainder of the pixels.

An objective of imaging systems for reading out images with sparse information is to obtain the positions of the impacted pixels and the intensity of the impact.

Such imaging systems may for example be applied for X-ray imaging, for X-ray photon counting, for CT, for gamma ray detection with spatial resolution, for a neutron camera, for high energy physics, or for electron microscopy.

These imaging systems suffer from problems when the impact rate of the particles/photons is so high that the imaging system cannot be read out fast enough to grasp each individual impact.

Prior art solutions address this problem by limiting the flux or fluence (particles/area/time) or by integrating the signal of a pixel over time. Thereby, multiple impacts on the same pixel are integrated such that all impacts are grasped. However, individual impacts within the same integration period cannot be distinguished anymore. Thus place/shape/amplitude information of the constituting impacts is lost. These solutions result in a worse position resolution and in an increased noise level.

In more advanced prior art solutions this problem is addressed by using smart pixels. Smart pixels have integrated features which allow them to count events in the pixels and which even allow them to execute operators in the pixels or in a local group of pixels to obtain sufficient resolution. An example thereof is disclosed in US2010/0213353 A1 (Analog photon counting). A problem of these pixels is, however, that they have a large size (e.g. >30 µm) compared to regular pixels. Therefore they cannot be used in a high resolution imager.

SUMMARY OF THE INVENTION

It is an object of embodiments of the present invention to provide systems and methods which allow to read out images which are the result of sparse impacts (events) but at a high frame rate. In particular, the systems and methods according to embodiments of the present invention may be useful in cases where the number of hits ranges from a few to a several 100 hits per pixel per second. These can be read out at a frame rate that is much higher than this per pixel hit rate, for instance at least 10 times higher. At such frame rate, for every consecutively generated image, the number of pixels having received a hit is low.

The above objective is accomplished by a method and device according to the present invention.

In a first aspect, the present invention provides an imaging system for detecting one or more sparse events in a pixel array. The pixel array comprises pixels logically arranged in rows and columns. A sparse event is an event whereby the number of hits per pixel per second is at least 10 times smaller than the frame rate. In accordance with the present invention, the imaging system comprises the pixel array and a processing area adjacent to the pixel array, wherein the imaging system is configured to transfer pixel information of a subgroup of pixels of the pixel array (this subgroup also being called a slice) to the processing area and wherein the processing area is configured to process the event's information present in the transferred pixel information.

It is an advantage of embodiments of the present invention that sparse hits can be detected. Embodiments of the present invention may be used to detect impinging particles or photons whereby a fast readout is required and whereby only few pixels (for example less than 10% or even less than 1% of the pixels) are being hit by a particle or photon. The event may have a size of only 1 or a few pixels (e.g. less than 20, or even less than 10, or even less than 5). It is an advantage of embodiments of the present invention that the imaging system is capable to see and discriminate individual simultaneous events. It is an advantage of embodiments of the present invention that the processing area is separate from the pixel array, since this prevents that the pixel size increases when adding processing functionality. The physically larger operators are implemented in the processing area instead of directly in the pixel. The pixels can thus remain small. It is an advantage of embodiments of the present invention that the position of an event and the magnitude of an event can be determined. The magnitude may be represented by the peak intensity or the integrated intensity of the event or another representative measure.

In an imaging system according to embodiments of the present invention, the subgroup of pixels of the pixel array is a group comprising a number of rows which is less than 20% of the number of rows of the pixel array. It is an advantage of embodiments of the present invention that the pixel information of a number of rows in the pixel array can be processed by the processing area. The physical size of the pixel array is decreased by moving the processing functionality towards the processing area.

In embodiments of the present invention, the processing area may be configured to detect the presence of an event in the transferred pixel information of pixels of one or more columns of the subgroup. It is an advantage of embodiments of the present invention that an event can be detected by only looking to the presence of a hit at column level. The processing load can be reduced by detecting which columns are hit, in a first step, and by processing only those columns which were hit, in a second step. Due to the sparse character of the events only a limited number of columns will need to be processed. Therefore the required processing time can be reduced.

In an imaging system according to embodiments of the present invention, a chain of logic gates may be configured in the processing area for detecting an event in the transferred pixel information of the subgroup of pixels. An event can be detected using such a chain of logic gates, which is a fast and cheap implementation.

The processing area may be configured to provide data usable to determine the center of gravity of an event. A better-than-pixel resolution can be obtained for the center of gravity of the event by combining the information of all pixels of the event. In applications where sparse events need to be detected by the imaging system often only the overall position of the event is of importance. The overall position may be represented by the center of gravity of the event. It is therefore an advantage of embodiments of the present invention that the center of gravity of an event is obtained by the processing area. The center of gravity may thereby be obtained using analog or digitized pixel information.

An imaging system according to embodiments of the present invention may furthermore comprise an external processing unit, wherein the imaging system is configured for transferring part of the information of the subgroup, for instance pixel information or event information, such as e.g. position or height, to the external processing unit. Part of the post-processing may thus be done off chip, for instance in a more performant processing device.

In an imaging system according to embodiments of the present invention, the processing area may comprise a cell per pixel of the subgroup, wherein the cell comprises a sense amplifier, logic and switches. Standard 3T/4T active pixel technology can be re-used in the cells of the processing area, in accordance with embodiments of the present invention.

In an imaging system according to embodiments of the present invention, a cell of the processing area may comprise a sense amplifier for reading out and amplifying a signal, for instance a voltage signal representing a radiation signal, of a pixel in the pixel array. It is an advantage of embodiments of the present invention that the output signal of the pixel, which is the radiation signal, may be amplified before being processed in the processing area. The sense amplifier may for instance be implemented as a capacitive transimpedance amplifier.

In an imaging system according to embodiments of the present invention, the pixels may be arranged to convert impinging electromagnetic radiation or high energy particles into an analog or a digital signal. Thereto, the pixels may comprise a radiation receptor, for instance a regular or pinned photodiode, or any suitable element capable of converting impinging electromagnetic radiation or high energy particles into a radiation signal. The digital signal may be a binary signal or a multiple level signal. If the signal is a digital signal, the sense amplifier may be simplified, or in some cases completely avoided and left out.

In alternative embodiments of the present invention, the processing area may be configured to digitize the radiation signal. Again, the resulting digital signal can be binary, but also multiple levels.

It is an advantage of embodiments of the present invention where digital signals are created, that digital post-processing of the pixel information is possible.

An imaging system according to embodiments of the present invention may furthermore comprise an external processing unit, wherein the imaging system is configured for transferring part of the pixel information of the subgroup to the external processing unit. This way, off-chip processing, in a possibly more performant processor, can be performed.

In a second aspect, the present invention provides a method for detecting one or more events in a pixel array comprising pixels logically arranged in rows and columns, of which at least one pixel is hit by impinging radiation. The method comprises transferring pixel information of a subgroup of pixels of the pixel array to a processing area configured to process the transferred pixel information for detecting the one or more events.

In a method according to embodiments of the present invention, detecting the one or more events may comprise detecting whether or not any of the pixels of a column have been hit by impinging radiation, and if so, processing the information of that column.

In a method according to embodiments of the present invention, detecting the one or more events may comprise determining the center of gravity of the event.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 19 shows a table with centers of mass of an event calculated in accordance with embodiments of the present invention.

Figure 1:
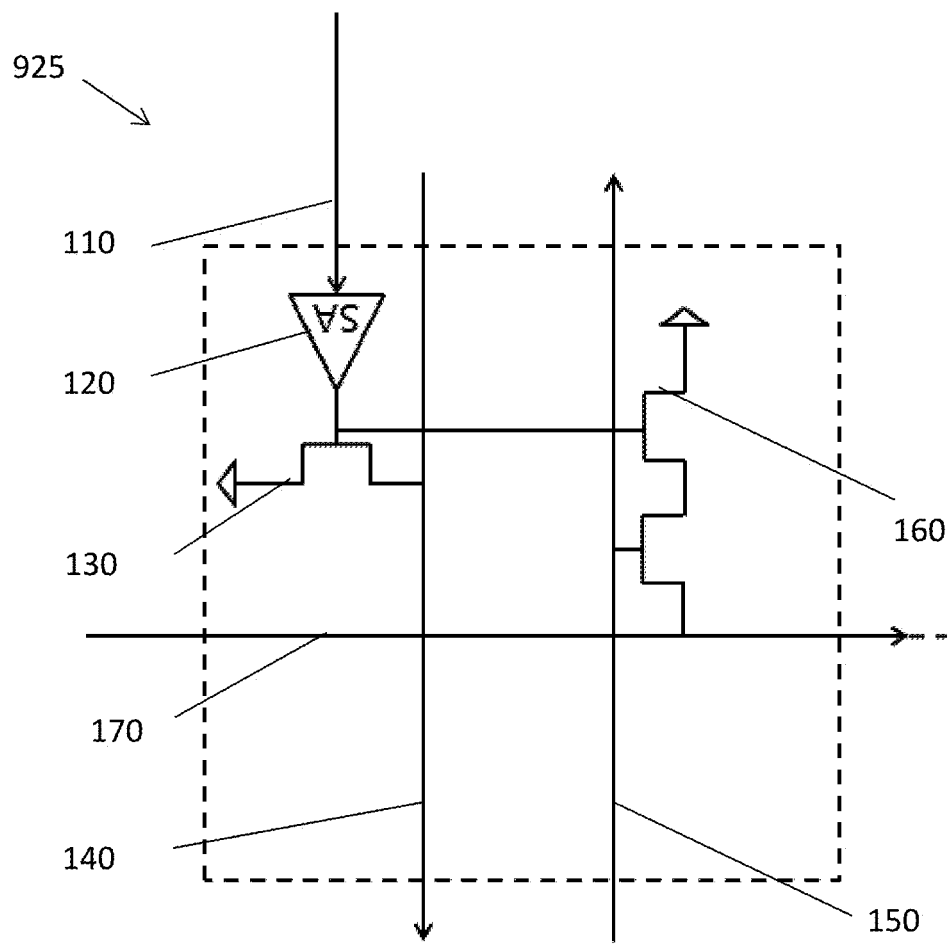
FIG. 1 is a schematic drawing of a cell in the processing area of an imaging system according to an embodiment of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Furthermore, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may do so. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in the context of the present invention reference is made to an "array of pixels" or a "pixel array", reference is made to a set of pixels logically organized in rows and columns. Throughout this description, the terms "horizontal" and "vertical" or "X-direction" and "Y-direction" (related to the terms "row" and "column", respectively) are used to provide a co-ordinate system and for ease of explanation only. They do not need to, but may, refer to an actual physical direction of the device. Furthermore, the terms "column" and "row" are used to describe sets of array elements which are linked together. The linking can be in the form of a Cartesian array of rows and columns; however, the present invention is not limited thereto. As will be understood by those skilled in the art, columns and rows can be easily interchanged and it is intended in this disclosure that these terms be interchangeable. Also, non-Cartesian arrays may be constructed and are included within the scope of the invention. Accordingly the terms "row" and "column" should be interpreted widely. To facilitate in this wide interpretation, the description of the present invention refers to "logically organized in rows and columns". By this is meant that sets of pixels are linked together in a topologically linear intersecting manner; however, that the physical or topographical arrangement need not be so. For example, the rows may be circles and the columns radii of these circles and the circles and radii are described in this invention as "logically organized" rows and columns.

Where in embodiments of the present invention reference is made to a "slice" reference is made to a subgroup of pixels of the pixel array whereby the subgroup comprises a number of rows of the pixel array less than all rows of the pixel array. The slice may comprise an equal number of columns as the pixel array, or less columns.

Where in embodiments of the present invention reference is made to "a hit", reference is made to an impacting photon or particle on a pixel. The pixel output may thereby be evaluated with regard to a threshold value to decide whether or not a hit occurred.

Where in embodiments of the present invention reference is made to "an event", reference is made to the impact of a single photon or particle or of a group of photons or particles and to the effect this impact has on the electrical output, e.g. the charge/voltage/current of the output, of a pixel or group of adjacent pixels. An event may result in one pixel being hit or in a plurality of adjacent pixels being hit. When a group of photons is considered, only a simultaneous impact is considered. In accordance with embodiments of the present invention an event is defined along the X-axis as a consecutive series of columns of a pixel array which all have been hit (at least one pixel in each column of the slice has been hit). With "sparse event" is meant an event whereby the number of hits per pixel per second is at least 10 times smaller than the frame rate of the imaging system, the frame rate being the frequency at which the imaging system produces unique consecutive images (frames).

Where in embodiments of the present invention reference is made to "the information" of a pixel, reference is made to the electrical output, e.g. charge/voltage/current output, of a pixel. The pixel information may be digitized to a pixel value whereby the digitization may be based on a preset (static or dynamic) threshold value. The digitization may be binary or it may have a higher resolution (e.g. between 2 and 1000 levels).

Where in embodiments of the present invention reference is made to "a sense amplifier" reference is made to the front end of a cell receiving the signal of a pixel. The sense amplifier may sense low power radiation signals from a pixel, and amplify and/or digitize that signal. A sense amplifier may for example comprise an amplifier, a capacitor, a voltage buffer or it may comprise a pulse shaper and a comparator comparing the signal with a reference level.

Figure 9:
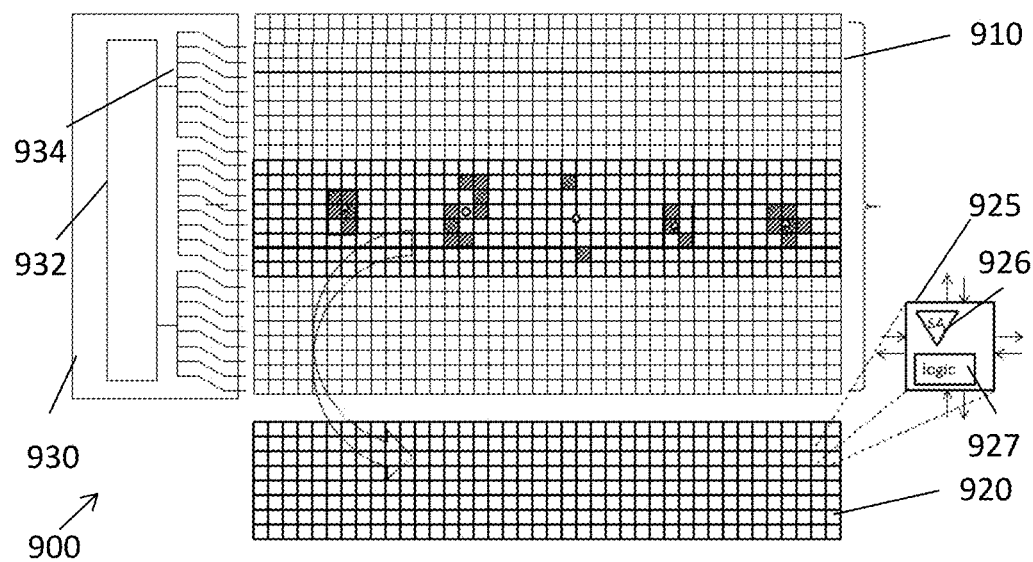
FIG. 9 shows an imaging system configured to transfer pixel information of a slice to the processing area in accordance with an embodiment of the present invention.

Embodiments of the present invention comprise a pixel array 910, in which a plurality of pixels are logically organized in a number N of rows and a number M of columns, and a processing area 920 adjacent to the pixel array, comprising a plurality of processing cells 925, as illustrated for instance in FIG. 9. With "a processing area adjacent to the pixel array" is meant a processing area which is configured such that pixel data can be transferred thereto. The processing area can be physically adjacent to the pixel array, for instance can be separated therefrom over a small distance, for instance a few micrometer, or can be separated over a larger distance, only limited by IC dimensions, or still more, for instance in a 2D or 3D hybrid configuration.

The pixel array 910 may comprise passive pixels, e.g. comprising a photodetector but no in-pixel amplifier. The processing area 920 may comprise a plurality of processing cells 925, logically organized in a same number M of columns as the pixel array 910, but a reduced number of rows, i.e. a number N1 of rows less than the number N of rows of the pixel array 910. In particular embodiments of the present invention, the number N of rows of the pixel array 910 may be an integer multiple of the number N1 of rows of the processing area 920. In accordance with embodiments of the present invention the processing area next to the pixel array comprises processing cells 925, which are cells configured to process pixel information rather than just capturing hits.

In accordance with embodiments of the present invention the sparseness of the frames, i.e. of the events detected by the pixel array, is exploited. Therefore, in accordance with embodiments of the present invention, subgroups of pixels of the pixel array 910, further called "a slice", comprising the same number of pixels as the number of processing cells in the processing area 920 are read out by the processing area 920 next to the pixel array 910. The processing area 920 may be configured to process the received information in digitized form or in analog form.

By moving the processing functionality from the pixel array 910 towards the processing area 920 the pixel size of the pixels in the pixel array 910 can be reduced. It is an advantage of embodiments of the present invention that pixels with a size smaller than 50 µm, preferably smaller than 10 µm can be provided.

In accordance with embodiments of the present invention the processing area 920 may be configured to process the pixel information of a subgroup of N1 rows of the pixel array 910, whereby N1 is an integral number smaller than the total number N of rows in the pixel array 910. A subgroup may for example comprise a number N1 of rows which is less than 20% of the number N of rows of the pixel array, for instance less than 10%, less than 5%, less than 3%, even less than 2%. Such a subgroup may for example be a subgroup of 8 rows, 16 rows, or for instance a number between 2 and 100 rows.

In accordance with embodiments of the present invention the information of a subgroup of N1 rows of pixels of the pixel array 910, also referred to as a slice, is transferred in parallel to the processing area 920. The information of different subgroups (slices) is transferred sequentially in time. One processing area can serve the whole pixel area 920 of the imager, or part of it; e.g. two processing areas located north and south of the pixel area may be provided; or one processing area per quadrant; or even more, wherein the processing areas may for instance be organized per group of columns.

FIG. 1 shows one cell 925 of the processing area 920 to which the signal 110 coming from a pixel of the pixel array 910 is transferred. A plurality of such cells are logically arranged in rows and columns so as to form the processing area 920. The illustrated cell 925 comprises a basic configuration, as an example only. Embodiments of the present invention may also comprise different configurations, for instance a four-transistor (4T) configuration. With each pixel in a slice of the pixel array corresponds a cell of the processing area 920, and vice versa, in a 1-to-1 relationship (projection). Information of a pixel of a slice is transferred to the corresponding cell of the processing area.

The signal 110 coming from a pixel of the pixel array 910 is sensed, amplified, and optionally digitized by a sense amplifier (SA) 120 in a processing cell 925 associated with and connected to that particular pixel. The processing cell 925, in the embodiment illustrated in FIG. 1, comprises a sense amplifier 120 and three transistors. The output of the sense amplifier 120 is connected to the gate of a first transistor 130, while the main electrodes of the first transistor 130 are coupled between an output column line 140 and ground. The second transistor 160 and the third transistor 180 are coupled with their main electrodes in a series connection between output row line 170 and a supply voltage. The gate of the second transistor 160 is coupled to the gate of the first transistor 130, and the gate of the third transistor 180 is coupled to a control line 150. It is obvious to the person skilled in the art to devise alternative circuits having the same or similar functionality.

The plurality of cells 925 of the processing area 920 have a same or similar lay-out. This means that every cell 925 of the processing area 920 will comprise an input port for receiving a signal 110 from a corresponding pixel, a sense amplifier 120 for receiving the signal 110 from the corresponding pixel and amplifying and optionally digitizing it, and a first transistor 130, a second transistor 160 and a third transistor 180 in a configuration as set out above. An output column line 140 connects to one of the main electrodes of the first transistor 130 of the cells 925 logically organized on a column. There is an output column line 140 for each column of processing cells 925 in the processing area 920. A control line 150 connects to the gate of the third transistor 180 of the cells 925 logically organized on a column. There is a control line 150 for each column of processing cells 925 in the processing area 920. An output row line 170 connects to a main electrode of the third transistor 180 of the cells 925 logically organized on a row. There is an output row line 170 for each row of processing cells 925 in the processing area 920.

The outputs on the main electrode of the first transistor 130 of a single column of processing cells 925 in the processing area 920 are connected together in a (wired) OR configuration on column line 140, which is connected with control logic. The control logic may be part of the processing area 920. The signal on the output column line 140 associated with a column of processing cells 925 indicates whether at least one pixel on the specific column in the slice contains a hit.

Control line 150, connected to the gates of the third transistors 180 logically organized on a row in the processing area 920, is also connected with control logic adapted for activating the column of which the cells must output their values onto the output row lines 170. When the control logic activates column Y for outputting its values, output row line 170 associated with row X contains the content of the pixel at [X, Y].

Figure 2:
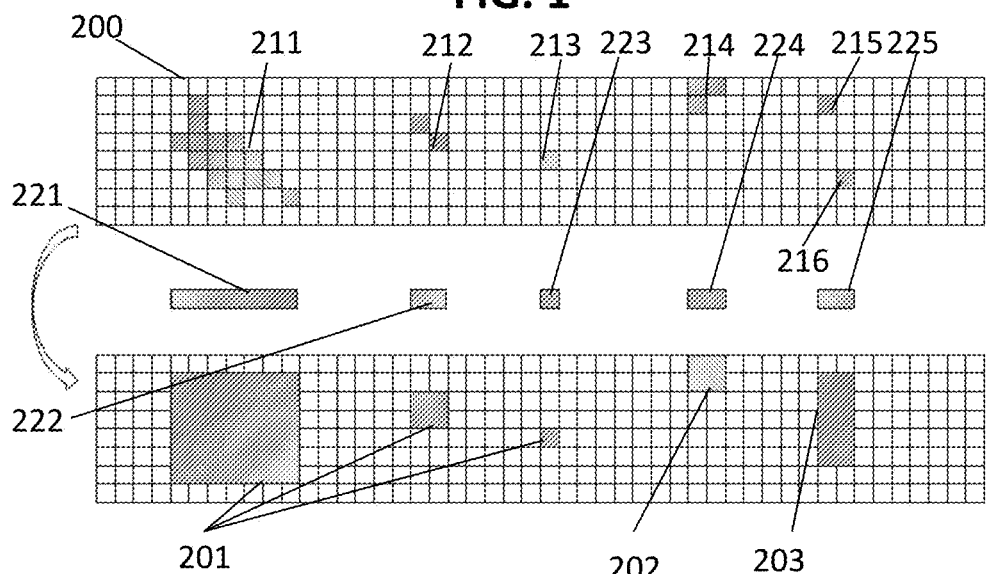
FIG. 2 shows a slice of a pixel array wherein some events are shown and the same slice showing the bounding boxes of the events in accordance with an embodiment of the present invention.

In accordance with embodiments of the present invention an event, i.e. the effect of the impact a single or a group of photons or particles has on a single or group of pixels, can be represented by a bounding box. This allows to reduce the amount of information per event to 4 numbers. This is illustrated in FIG. 2. The top array shows a slice 200 of processing area elements each processing information of one pixel. In the embodiment illustrated, the slice consists of N=8 rows and M=48 columns, but in practice these numbers can be largely different. A number of events have occurred in the slice 200, each event causing at least one pixel to be hit. The pixels which are hit are indicated in the top array of FIG. 2 as hatched, adjacent hit pixels forming event zones 211, 212, 213, 214, 215, 216 (215 and 216 are actually two hits). These event zones 211, 212, 213, 214, 215, 216 may be represented by their bounding boxes 201, 202, 203, as illustrated in the bottom array of FIG. 2. Hereto, in the case illustrated, as an example, the width of distinct event zones along the X-axis i.e. the direction of the rows, is defined, as illustrated by boxes 221, 222, 233, 224, 225 in between the top and the bottom figure illustrated in FIG. 2. The bottom figure shows the bounding boxes 201, 202, 203 of these events. Each bounding box can be represented by four numbers, for instance, the present invention not being limited thereto, the X-coordinates of the first and last pixel along the X-direction and the Y-coordinates of the first and last pixel along the Y-direction of a bounding box of an event (Xmin, Xmax, Ymin, Ymax) or the X-coordinate of the first pixel along the X-direction, the width along the X-direction of a zone corresponding to an event, and the Y-coordinates of the first and last pixel along the Y-direction of a bounding box of an event (Xmin, Xsize, Ymin, Ymax), or similar. In accordance with embodiments of the present invention these bounding boxes 201, 202, 203 are obtained in the processing area 920. Therefore the pixel information of a slice 200 is transferred to the processing area 920 which processes the transferred pixel information of the slice. Bounding boxes 201 show the bounding boxes of single events. Bounding box 202 shows the bounding box of an event at the edge of a slice. Bounding box 203 is a bounding box which is enclosing two events. It is an advantage of embodiments of the present invention that it is possible to also distinguish such two events within a same bounding box, as explained below.

In accordance with particular embodiments of the present invention, the bounding box is defined in the X-direction by a start X and a size in X-direction (Xmin, Xsize). The event may be defined along the x-axis by a start position. The start position is the column on which a pixel is hit whereby the column immediately neighboring this column at one side has no pixels which are hit. Between the start position and the end position of the event each column has at least one pixel which is hit and the column immediately neighboring the column at the end position at one side does not have any pixel which is hit. A representation of a circuit 301 for determining an event size in X is shown on the bottom of FIG. 3. The outcome of such circuit of AND gates is a number of ones, which equals the number of columns, starting from the start position of an event, over which the event is spread.

As an example, event zones 310 and 311 are considered. Event zone 310 has a start position 5 (column 5 is the column on which a pixel of event zone 310 is hit, whereby on column 4, immediately neighboring column 5, none of the pixels are hit). The size of the bounding box of events, starting from position 5 (column 5) is defined by counting all subsequent columns which also have at least one pixel which is hit. As soon as a column is reached which does not have any hit pixel, the size of the bounding box in X-direction is obtained. In the example illustrated, it can be seen that, besides column 5, also columns 6 to 9 each contain at least one hit pixel as part of event zone 310, and on top of that, columns 10 and 11 contain at least one hit pixel as part of event zone 311. Hence the size of the bounding box in X-direction is 7 (columns 5 to 11).

Figure 3:
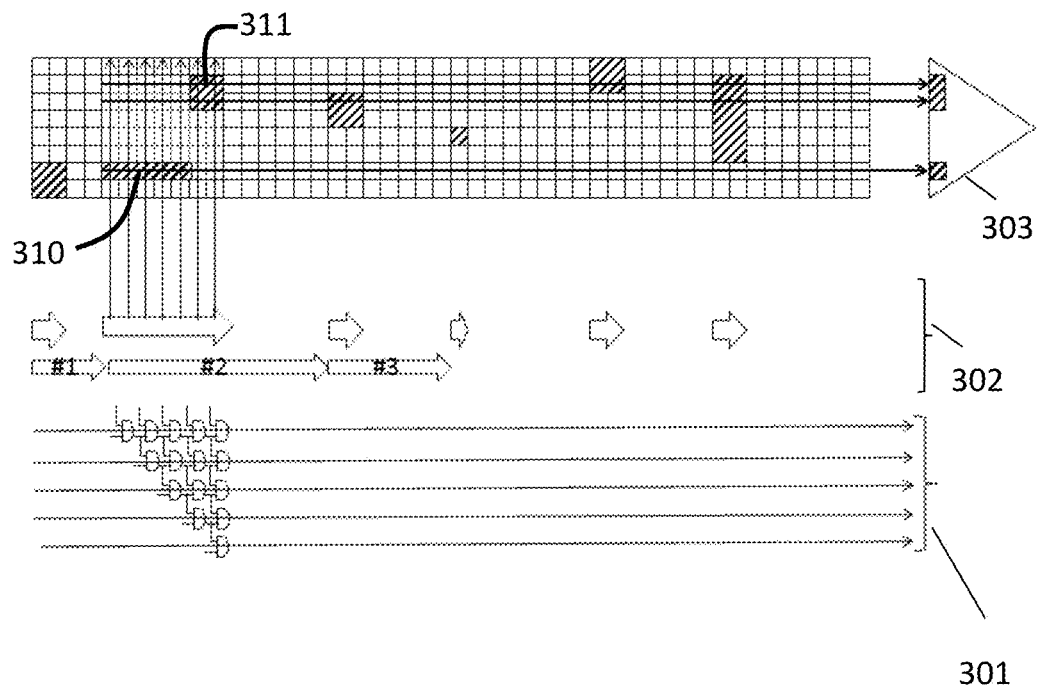
FIG. 3 illustrates the definition of an event along the X-axis and the projection of the same event on the Y-axis according to an embodiment of the present invention.

A chain 302 of next event positions is shown at the middle of FIG. 3. Event number 1 starts at column 1. Event number 2 starts at column 5. Event number 3 starts at column 18, etc. However, the width of an event zone does not occupy the complete width between the start of an event and the start of a neighboring event; there is always at least one column without hit pixels between every two event zones.

A projection 303 of event zones 310 and 311 of event number 2 on the Y-axis is shown on the top right hand side of FIG. 3. It is thereby an advantage that event number 2 can be subdivided in its two event zones 310 and 311 along the Y-axis (see also FIG. 6). In accordance with embodiments of the present invention, the projection of an event (the event itself being defined along the X-axis) on the Y-axis is referred to as a first word (word1). This information may be in digital format (digital word1).

It is an advantage of embodiments of the present information that events can be defined by reading out only part of the pixel information (e.g. by only verifying if a pixel on a column has been hit). Already this fact reduces the required processing time. Moreover, subsequent processing needs only to be done on the identified events and therefore the processing time can be reduced even more. It is possible to define events by reading out only part of the pixel information because only sparse events are considered.

In accordance with embodiments of the present invention the processing area 920 is configured to obtain the number of hits within an event for each position along the column direction (Y). Also the number of hits within an event, weighted with the X-position in the event, may be obtained for each Y position.

Figure 4:
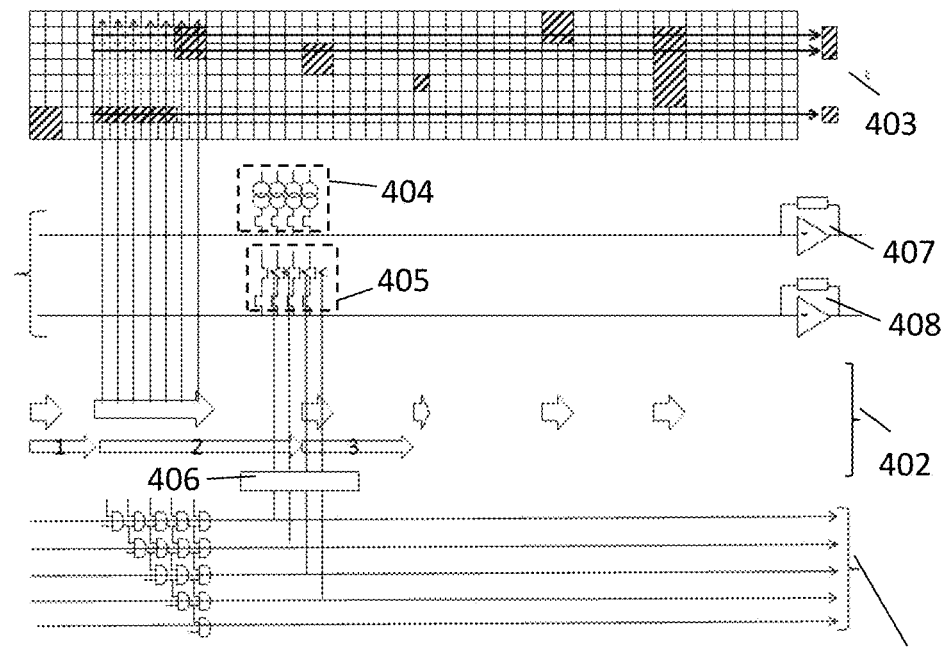
FIG. 4 illustrates how to obtain the center of gravity of an event in accordance with an embodiment of the present invention.

In accordance with embodiments of the present invention the processing area 920 may be configured to sum the output signals of the pixels belonging to a single row and belonging to a same event (defined along X-axis). This results in a second word per event and per slice (word2). The word may be in analog or in digital format. The output signals may be currents, which facilitates summation of signals. Such a summation of currents is illustrated in block 404 of FIG. 4. For each event in X-direction in sequence and separately, local logic (406 and a little cascade of AND gates as illustrated in the bottom part of FIG. 4) will determine which columns belonging to that event. The output of this logic 406 activates both (a) a set of equal current sources 404 and (b) a set of position [within event] dependent current sources 405. Each of (a) and (b) is activated when inside the event actually being scanned, AND the pixels on that position having been hit. FIG. 4 also shows a chain 402 of next event positions, similar to FIG. 3. The sum of current from equal current sources 404 and position dependent current sources 405 are measured in measurement circuits 407 and 408, respectively. Thus in the embodiment illustrated in FIG. 4, the processing area 920 comprises circuitry for a simple summation of the currents for every row in a slice.

In accordance with embodiments of the present invention the processing area 920 may be configured to sum the output signals of the pixels belonging to a single row and belonging to the same event, after weighting them with a weight which is dependent on the X-position inside the event under consideration, as illustrated by block 405. This results in third word per event and per slice (word3). The weighting might for example be done using a conversion block 406, illustrated in FIG. 4, which translates the position of occurrence of a hit to a particular current source, e.g. by creating a MOSFET "current mirror" in local logic 406, having current that depends on the X-position, feeding its $V_{GS}$ to a corresponding MOSFET in the processing element. A weighted summation of currents by the processing area is schematically illustrated in block 405 of FIG. 4. The total current is measured in circuit 408. The processing area 920 may be configured to do the weighted summation of the currents. For the example in FIG. 4 for the second event this may result in the summation of the following currents: 1 mA, 2 mA, 3 mA, 4 mA, 5 mA, 6 mA, 7 mA.

The processing area may be configured to obtain the three words as explained above, and as illustrated in FIG. 4:
a first word (word1) 403 having as many bits as rows in the slice, representing the projection of the occurrence of an event on the Y-axis,
a second word (word2) having as many analog values as rows in the slice, representing the summation of the currents (as shown in FIG. 4 this configuration may be done using analog circuitry 404), (also 780), a third word (word3) having as many analog values as rows in the slice, representing the weighted summation of currents (as shown in FIG. 4 this configuration may be done using analog circuitry 405), (also 770).

Figure 5:
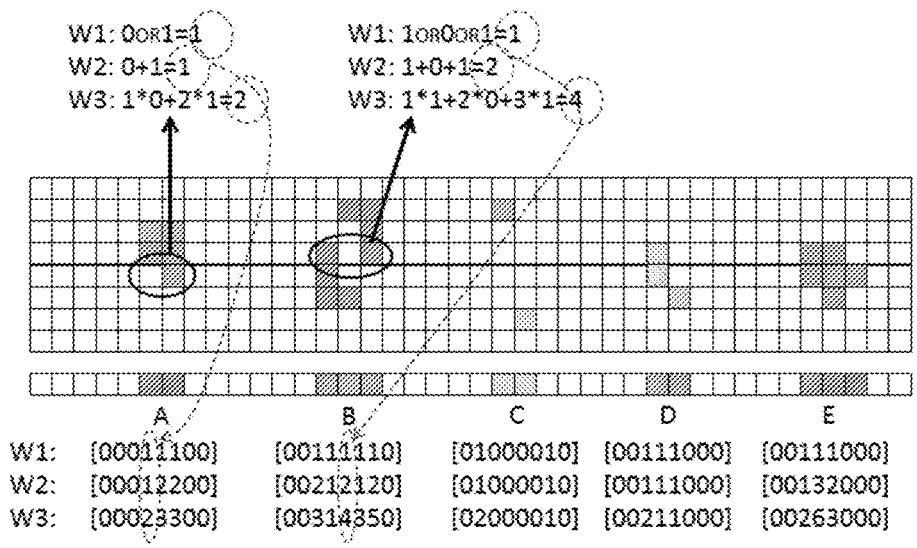
FIG. 5 illustrates a slice of a pixel array wherein some events are shown, as well as different word presentations of these events according to an embodiment of the present invention.

FIG. 5 illustrates a slice of a pixel array, of which several pixels have been hit by an event. These hit pixels are indicated as hatched in FIG. 5. Adjacent hit pixels together form an event zone. In a first step, as indicated above, for each event zone, a start pixel and an end pixel in X-direction are determined, or a start pixel and a size in the X-direction are determined, by projection of the event zones on the X-direction. As soon as one column without hit pixels is present in between two event zones, the event zones are separate zones. Such projections of the event zones onto the X-axis are illustrated as A, B, C, D, E in FIG. 5. For each event zone, the corresponding words are determined, in accordance with embodiments of the present invention.

Each bit in a word corresponds with information on a row of the slice. In the example the first bit of a word corresponds with the bottom row, the second bit corresponds with one row higher than the bottom row, etc.

A $K^{th}$ bit of word1 (W1=projection of event on Y-axis) of an event is obtained by OR-ing the binary pixel information of the pixels on the cross-sections of the $K^{th}$ row and the columns of the event. Hence the first three bits of word1 of event A (corresponding to the bottom three lines at the columns of event A) are 0, as these bits are the result of OR-ing 0 values. The fourth bit is the result, as indicated in FIG. 5, of 0 OR 1, hence 1. The fifth and sixth bits are the result of 1 OR 1, hence 1. The seventh and eighth bits are the results of 0 OR 0, hence 0.

A $K^{th}$ bit of word2 (W2) is obtained by summing the binary pixel information of the pixels belonging to the $K^{th}$ row and the columns on which the event (defined along the X-axis) occurred. Hence the first three bits of word2 of event A (corresponding to the bottom three lines at the columns of event A) are 0, as these bits are the result of summing 0 values. The fourth bit is the result, as indicated in FIG. 5, of 0+1, hence 1. The fifth and sixth bits are the result of 1+1, hence 2. The seventh and eighth bits are again the results of 0+0, hence 0.

A $K^{th}$ bit of word3 (W3) is obtained by summing the binary pixel information of the pixels belonging to the $K^{th}$ row and the columns on which the event (defined along the X-axis) occurred after multiplying the binary pixel information with a weighing factor. In this example the weighing factor corresponds with the position along the X-axis. The first pixel (along the X-axis) of the event has weight one, the second pixel has weight two, etc. Depending on the implementation other weights might be applied. For the embodiment illustrated in FIG. 5, for event A, the first three bits of word3 (corresponding to the bottom three lines at the columns of event A) are 0, as these bits are the result of summing 0 values. The fourth bit is the result, as indicated in FIG. 5, of 1*0+2*1, hence 2. The fifth and sixth bits are the result of 1*1+2*1, hence 3. The seventh and eighth bits are again the results of 1*0+2*0, hence 0.

The words W1, W2 and W3 can be defined in a similar manner for all events occurring in a slice. Examples are given in FIG. 5.

In accordance with embodiments of the present invention the pixel resolution of the center of the event may be obtained by combining the information of all pixels of the event. This information may be combined using already know techniques such as, amongst others, centroiding, superresolution, center of bounding box, center of gravity. The analog or digitized information of the pixels seeing the event or of the pixels in the immediate neighborhood of the event may be used therefor. The words W1, W2, and W3 might for example be used to obtain the centroid of an event. The centroid is the center of gravity (COG). For one row only the COG is:

$$COG_x = \frac{W3}{W2} + X\min$$

For the full event, this can be extended as:

$$\text{center of gravity}(x, y) = \left( \frac{\sum_{j=1}^{N}\sum_{i=1}^{N} x_i \cdot A_{i,j}}{\sum_{j=1}^{N}\sum_{i=1}^{N} \cdot A_{i,j}} + X\min, \frac{\sum_{j=1}^{N}\sum_{i=1}^{N} y_i \cdot A_{i,j}}{\sum_{j=1}^{N}\sum_{i=1}^{N} A_{i,j}} \right)$$

whereby the first term corresponds with sum(W3)/sum(W2) and the second term corresponds with $$\frac{\sum_{i=1}^{8} i \cdot W2(i)}{\sum W2}.$$

Figure 6:
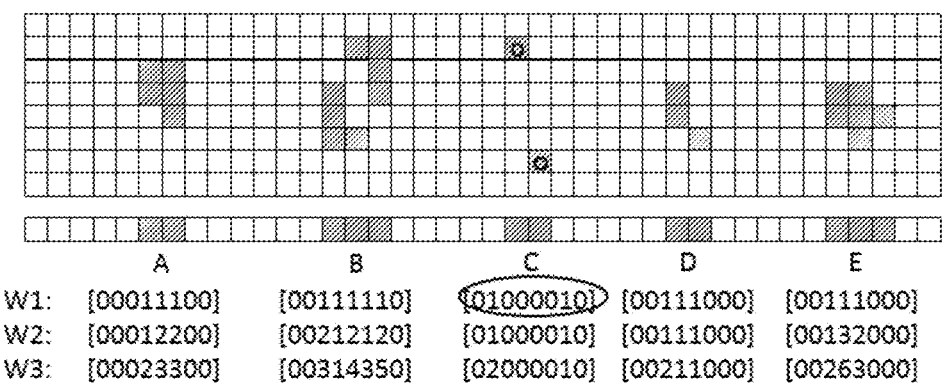
FIG. 6 illustrates a slice of a pixel array wherein an event defined along the X-axis can be divided into sub-events according to an embodiment of the present invention.

FIG. 6 shows a situation where an event (event C) can be separated into two separate smaller events in the Y-direction. Each of them may for example be related to a separate physical event. Event C with words W1, W2, W3 can be separated into two words by analyzing W1. The results in a first event C1 with:
W1=[00000010]; W2=[00000010]; W3=[00000010]
and a second event C2 with:
W1=[0100000]; W2=[0100000]; W3=[0200000]
The center of gravity of C1 is:
X=1/1=1; Y=7/1=7.
The center of gravity of C2 is:
X=2/1=2; Y=2/1=1.
In accordance with embodiments of the present invention the words W1, W2 and W3 and possibly additional words being linear combinations of the columns of the slice may be analyzed to obtain a more accurate subdivision of events into sub-events. These may be associated with physical events. The processing area may be configured to calculate a center of gravity for each of the individual sub-events.

Figure 7:
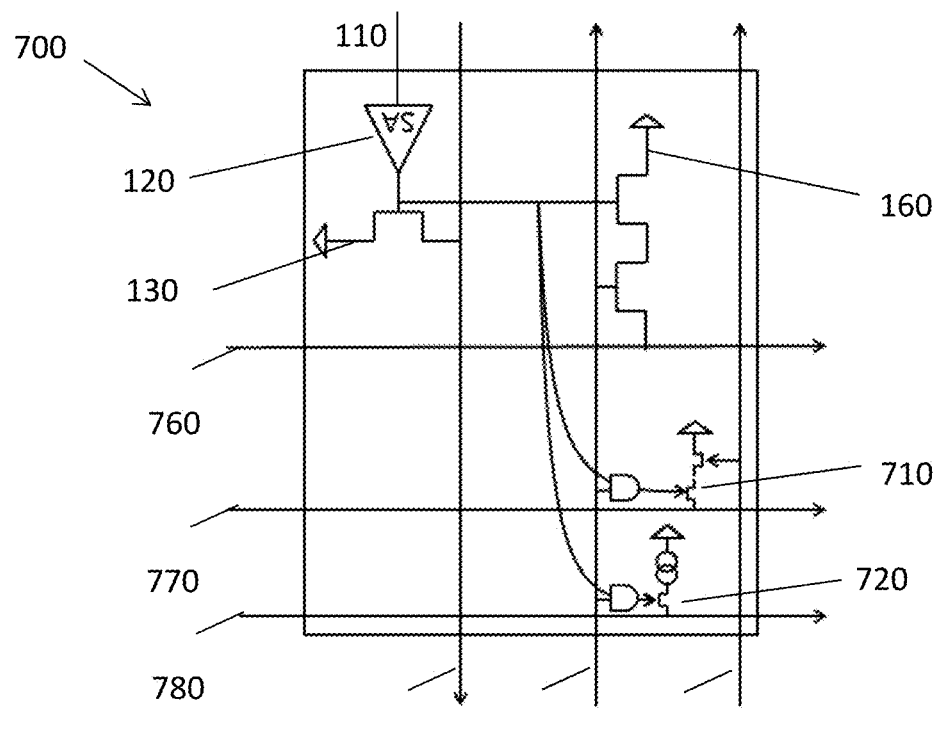
FIG. 7 shows a schematic drawing of a cell in the processing area of an imaging system according to an embodiment of the present invention.

FIG. 7 shows a possible implementation of one cell 700 in a processing array 920 in an embodiment of the present invention. Wires are oriented in the Y-direction, which is in the direction of a column (the vertical direction in FIG. 7) and in the X-direction which is the direction of a row (the horizontal direction in FIG. 7). The first wire 730 in the Y-direction provides a wired OR-function of all signals appearing in cells on a column of the processing area 920. The signal on this wire indicates whether the column of which the present cell forms part, contains a hit or not. The second wire 740 in the Y-direction, connected with the transistors 180, is used to select the column which must output its values. The third wire 750 in the Y-direction is used to apply a current mirror gate source voltage (Vgs) to determine a current that is proportional to X-Xmin (i.e. the position of the current cell in relation to the first cell—start position—of an event). Herein X is the column number of the column of the slice of which the current cell forms part, and Xmin is the column number of the slice at which the event of which column X forms part, starts. In accordance with embodiments of the present invention these three wires in the Y-direction are controlled and monitored by control logic which may be present in the processing area 920. Alternatively, the control logic may be provided separate from the processing area 920.

The signal on the first wire 760 in the X-direction is "1" if the row contains at least 1 hit in the range Xmin-Xmax, i.e. within the width of the event. The first wire 760 corresponds with 1 bit of word1. The second wire 770 in the X-direction feeds a current that is equal to the summation of the currents weighted with the X-position in the range Xmin-Xmax (a possible circuitry therefore is circuitry 710). In this embodiment of the present invention the weight factor is equal to X-Xmin. The second wire 770 corresponds with 1 bit of word3. The third wire 780 in the X-direction feeds a current that is proportional to the number of hits on this row in the range between Xmin-Xmax (a possible circuitry therefore is circuitry 720). The signal coming from the pixel over line 110 is sensed, amplified, and optionally digitized by the sense amplifier (SA) 120. The sense amplifier 120 is connected to the gate of a transistor 130. The sources of all transistors of which the gates are connected with pixels belonging to the same column are connected together in a (wired) OR 730 which is connected with control logic.

In accordance with embodiments of the present invention a chain of logic gates (e.g. OR, NAND) may be configured to detect a next event in the spatial (X) dimension. The on-chip circuitry may be implemented as a ripple carry adder, or as a carry look-ahead circuit. Alternative implementations to increase the speed may for instance be a carry-save adder, a carry-bypass adder, a carry-skip adder, an instant ripple carry, a Manchester carry chain; the present invention, however, not being limited thereto.

Figure 8:
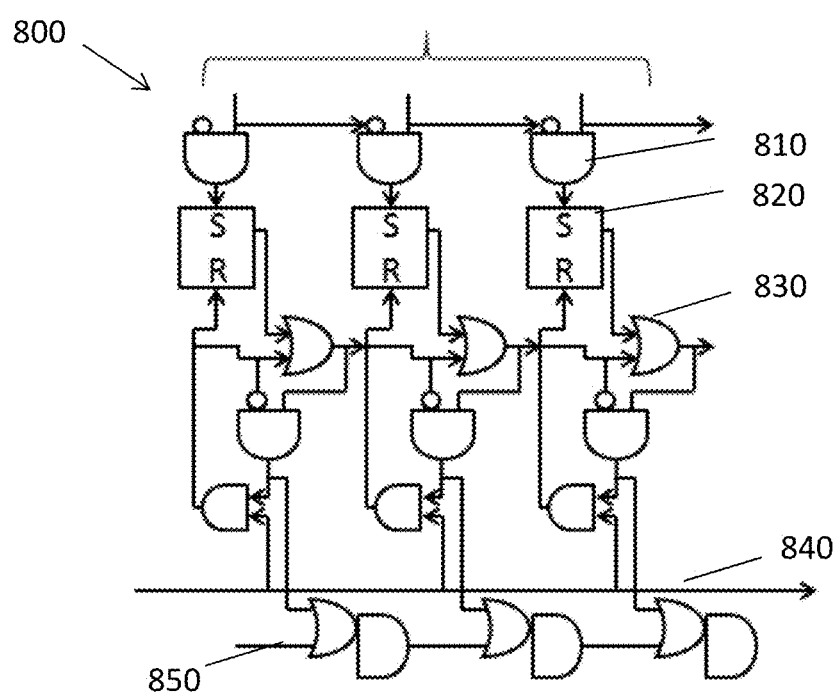
FIG. 8 shows a priority encoding implementation in accordance with an embodiment of the present invention.

In accordance with embodiments of the present invention an event is defined along the X-axis as a consecutive series of columns which all have been hit (at least one pixel in each column of the slice has been hit). A hit in the column of a slice may for example be represented by a 1, when no hit occurs in a column this may be represented by a zero. A possible (wired) OR of all hits in a column in a slice may be:
00000110000001000011001111100000110000
The different events in this sequence may be identified by "priority encoding". In accordance with embodiments of the present invention such a priority encoding may be implemented according to the scheme illustrated in FIG. 8. The wires arriving at the AND ports at the top of the scheme are OR wires 730 of the columns of a slice. The start position in X of each event is obtained by a parallel circuit using (N)AND gates 810. The result of this circuit of (N)AND gates is that only the leftmost of a group of "1" stays 1. A set/reset flipflop 820 (or an alternative implementation) may freeze this data resulting in:
00000100000001000010001000000000100000
A possible implementation to find the first event starting from the left (i.e. to do the priority encoding), is a chain of ORs 830, yielding:
00000100000000000000000000000000000000
To find the next event the set/reset flipflop of the actual event is reset by an (asynchronous or synchronous) "next event" pulse on the wire 840 and having the chain of ORs 830 race again, yielding:
00000000000001000000000000000000000000
This can be continued for all next events until all events of that slice are read out. Logic circuits 850 serves to flag all columns that belong to the actual event.

A next event may be triggered synchronously at fixed time intervals or asynchronously for example after readout of the previous event.

The priority encoding (implemented previously as a chain of ORs), may also be implemented in a hierarchical way similar to the implementation of fast carry logic used in logic adders and counters—see for instance Wikipedia, under lemma "Adder (electronics)", see ripple carry, carry-look-ahead, and many others mentioned.

FIG. 9 shows an imaging system 900 comprising a pixel array 910 and a processing area 920 in accordance with the present invention. The pixel information of a slice of pixels is transferred to the processing area 920. The embodiment of FIG. 9 comprises Y-addressing logic 930 comprising an address decoder 932 (one position per slice), and a barrel shifter 934 for selecting a specific slice of the pixel array 910 of which the pixel information will be transferred to the processing area 920. This barrel shifter can be used to finely shift the position of the slice in pixel array space, so as to minimize artefacts at the border between two slices. FIG. 9 also shows a schematic presentation of a cell 925 of the processing area comprising a sense amplifier 926 and logic 927.

Figure 10:
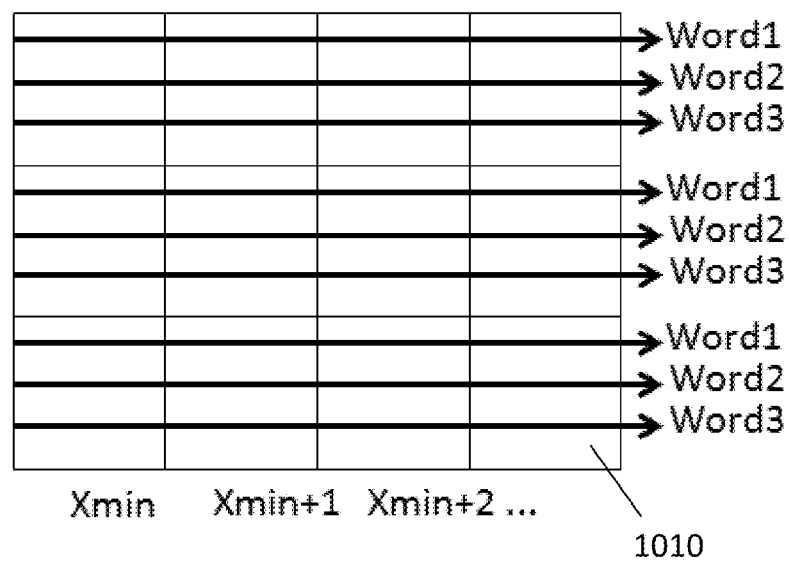
FIG. 10 shows a processing area comprising three wires per row of cells, running through the cells along the X-axis in accordance with an embodiment of the present invention.
Figure 11:
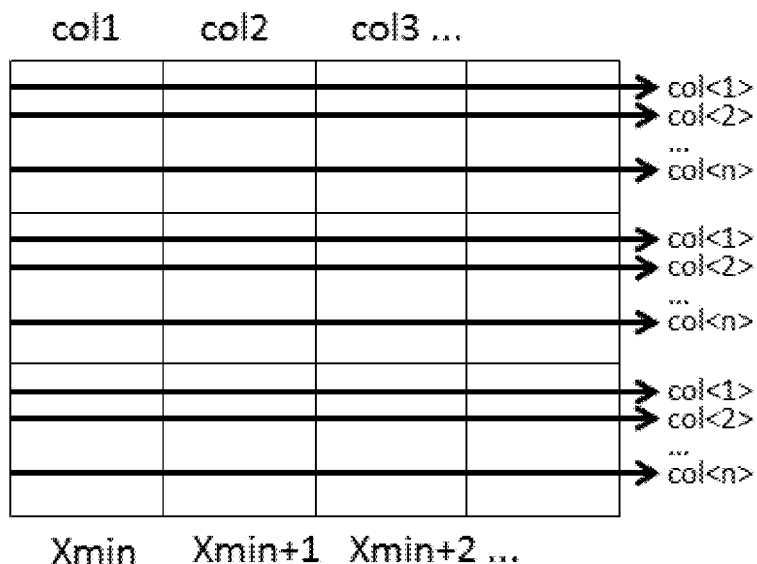
FIG. 11 shows a processing area comprising n wires per row of cells, running through the cells along the X-axis in accordance with an embodiment of the present invention.
Figure 12:
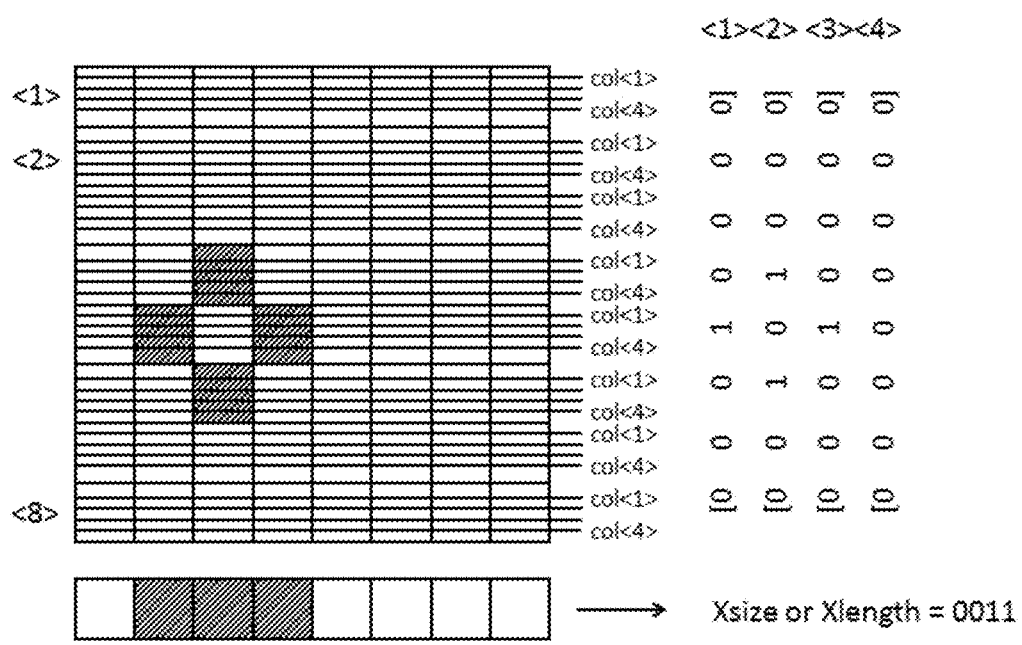
FIG. 12 shows a processing area comprising 4 wires per row of cells, running through the cells along the X-axis in accordance with an embodiment of the present invention.

Three wires along the X-axis run through the cell illustrated as an example in FIG. 7. This allows to obtain three words for representing the event. A part of a processing area 920 comprising such cells is illustrated in FIG. 10. Only the first columns of the processing area, starting from the column where a new event occurred (Xmin), are shown. Each of the squares in FIG. 10 represent a cell 1010. In accordance with embodiments of the present invention n wires along the x-axis are running through a cell of the processing area. The number of wires (n) may thereby be larger than 3. FIG. 11 shows a part of a processing area according to embodiments of the present invention whereby each wire corresponds to a different column. FIG. 12 shows a slice of 8 rows with 4 wires per row whereby each wire corresponds with a different column. Therefore 4 columns can be readout simultaneously which allows to read out an event size of 4 in the X-dimension. An example of such an event is shown in FIG. 12. The pixel values which are obtained for the first column are [00010000], those for the second column are [00101000], those for the third column are [00010000] and those for the fourth column are [00000000]. The event length is 3 in this example.

Figure 13:
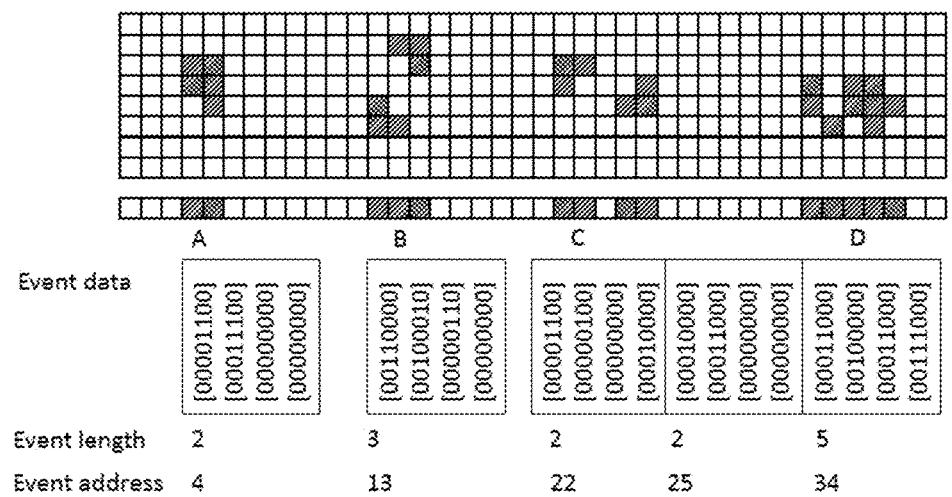
FIG. 13 shows a slice, including some events, and for each event the event data, the event length and the event address in accordance with embodiments of the present invention.

FIG. 13 shows multiple events A,B, C and D in a slice. The top area shows the slice area. Below the slice area the events are shown along the X-axis. The event data for each of the different events whereby the event is readout starting at the beginning of the event along the X-axis as well as the event length and the event address are also shown in FIG. 13. The event address is the column number at which the event starts along the X-axis.

Figure 14:
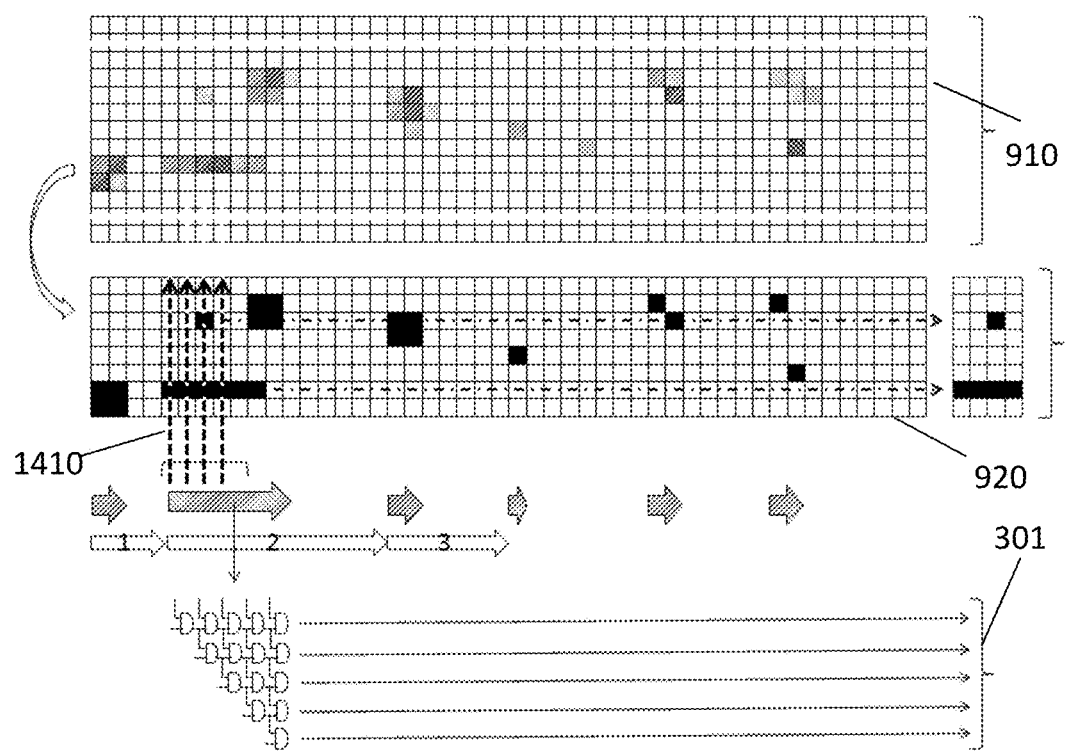
FIG. 14 illustrates a pixel array, a processing area, and a set of events in accordance with an embodiment of the present invention.

The top array 910 in FIG. 14 shows a pixel array 910 and in the pixel array the pixel information is illustrated by dashed lines of different thickness or by dots representing analog pixel information. The area below the pixel array shows a slice of the pixel array to be processed by the processing area 920. The pixel information of this slice is transferred to the processing area 920 which is configured to process the transferred pixel information of the slice. In this example N (N=4) columns of the slice are readout in parallel, the first column corresponding with the beginning of the event in the X-dimension. The number of parallel readout wires of the columns is, however, not limited to 4, it might for example be between 2 and 10 or even more. The dashed arrows 1410 show the projection of the events on the X-axis. The representation of the event size in the X dimension is done by the AND ports 301.

Figure 15:
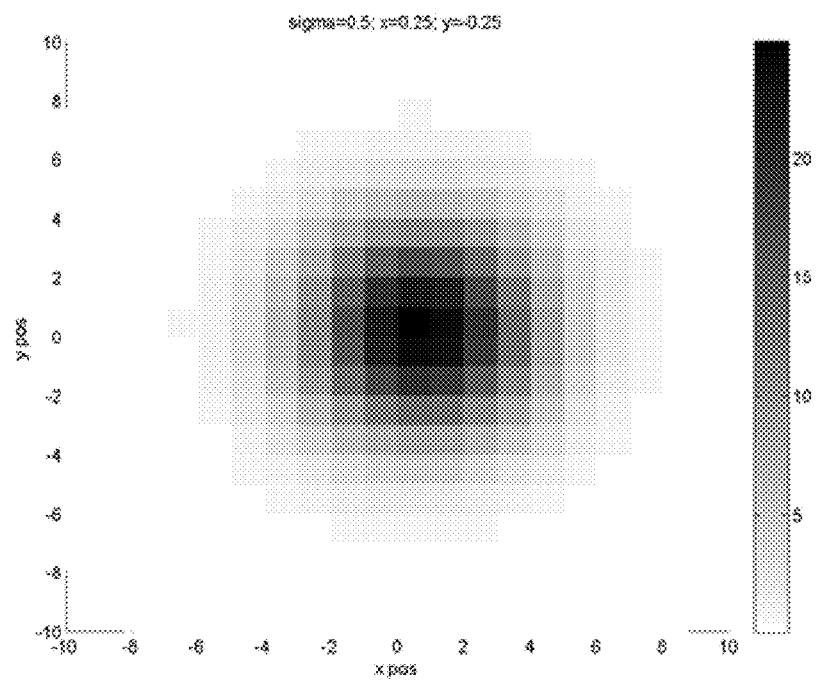
FIG. 15 illustrates a pixel array including an event with a Gaussian distribution.
Figure 16:
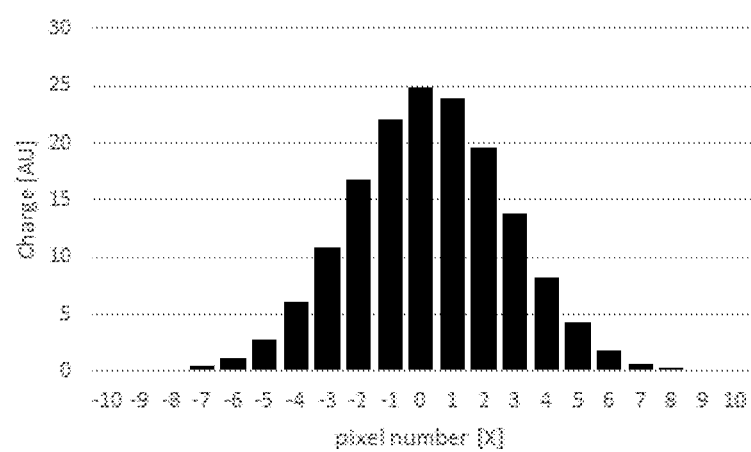
FIG. 16 illustrates the cross-section of an event through the center pixel along the X-axis.
Figure 17:
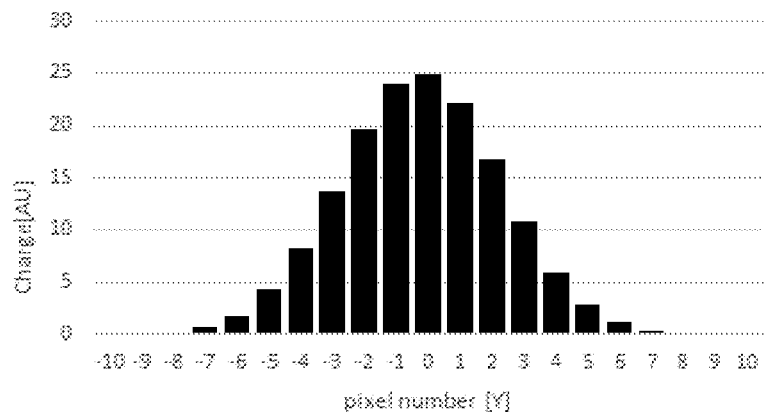
FIG. 17 illustrates the cross-section of an event through the center pixel along the Y-axis.
Figure 18:
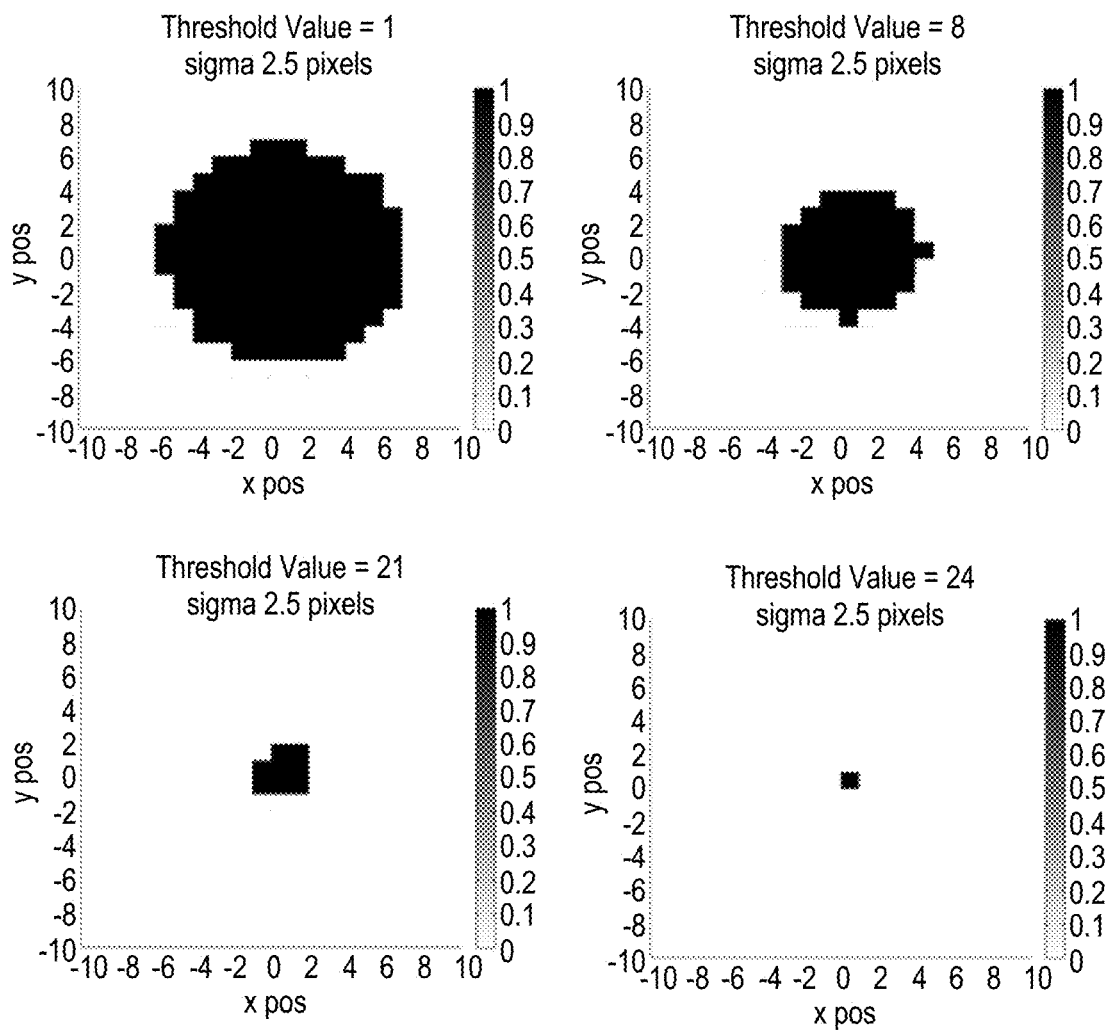
FIG. 18 is a plot of hits related to an event.

An event might have a Gaussian distribution whereby, for instance, the width of the distribution (sigma) is 2.5 pixels and the center of the distribution is shifted with ¼ pixel to the right and down with regard to the center of a 21×21 pixel field. FIG. 15 shows a pixel array recording such event. FIG. 16 is a graph illustrating the charge of the impact at each pixel along the X-axis. FIG. 17 is a graph illustrating the charge of the impact at each pixel along the Y-axis. In both figures the charge of the output of the pixels is shown in function of the pixel number. FIG. 18 shows the plot of the hits related to an event. The pixel information is binarized using a threshold value. The threshold value can be set so that the center of gravity of the hits is found. In the example illustrated, the threshold value is 1 in the top left graph, 8 in the top right graph, 21 in the bottom left graph and 24 in the bottom right graph. In accordance with embodiments of the present invention the processing array 920 is configured to obtain the center of gravity using these binary values. A better than pixel resolution can be obtained if the event contains more than a single hit. An example thereof is illustrated by the table in FIG. 19. The number of hits (in this case binary ones) decreases with an increasing threshold. In this example the real analog center of gravity position is (0.25, −0.25). The x and y column show the calculated center of gravity based on the binarized pixel information. The error column shows the error in function of the used threshold. In the case of threshold 24, a single hit is evaluated and the center of gravity corresponds to the nearest gridpoint, which has an error of sqrt(2*0.25$^2$)=0.354. In the example illustrated in FIG. 19, the position error decreases with an increasing number of hits. As such, a better then pixel resolution can be obtained. In some applications the most frequent event is an event with one hit on a pixel.

The invention claimed is:

1. An imaging system for detecting one or more sparse events, wherein an event results in one pixel being hit or a plurality of adjacent pixels being hit, in a pixel array comprising pixels logically arranged in rows and columns, the imaging system comprising the pixel array and a processing area adjacent to the pixel array, the processing area comprising a plurality of processing cells logically organized in the same number of columns as the pixel array but a reduced number of rows, wherein the imaging system is configured to transfer analog pixel information of a subgroup of pixels of the pixel array to a same number of processing cells in the processing area and wherein the processing area is configured to digitize and process the event's information present in the transferred analog pixel information, wherein the processing area is configured to detect the presence of an event in the transferred analog pixel information of pixels of one or more columns of the subgroup, thereby looking to the presence of a hit at column level and not for each individual pixel in a first step, and to process only those columns which are hit, in a second step, wherein the pixels of the pixel array have a size smaller than 50 μm.

2. An imaging system according to claim 1, wherein the subgroup of pixels of the pixel array is a group comprising a number of rows which is less than 20% of the number of rows of the pixel array.

3. An imaging system according to claim 1, wherein a chain of logic gates is configured in the processing area for detecting an event in the transferred analog pixel information of the subgroup of pixels.

4. An imaging system according to claim 1, wherein the processing area is configured to provide data usable to determine the center of gravity of an event.

5. An imaging system according to claim 1, furthermore comprising an external processing unit, wherein the imaging system is configured for transferring part of the information of the subgroup to the external processing unit.

6. An imaging system according to claim 1, wherein the processing area comprises a cell per pixel of the subgroup, wherein the cell comprises a sense amplifier, logic and switches.

7. An imaging system according to claim 1, wherein a cell of the processing area comprises a sense amplifier for reading out and amplifying a signal of a pixel in the pixel array.

8. An imaging system according to claim 1, wherein the pixels are arranged to convert impinging electromagnetic radiation or high energy particles into an analog signal.

9. An imaging system according to claim 1, furthermore comprising an external processing unit, wherein the imaging system is configured for transferring part of the analog pixel information of the subgroup to the external processing unit.

10. Method for detecting one or more events in a pixel array comprising pixels logically arranged in rows and columns, of which at least one pixel is hit by impinging radiation, the method comprising transferring analog pixel information of a subgroup of pixels of the pixel array to a processing area configured to digitize and process the transferred analog pixel information for detecting the one or more events, the processing area comprising a plurality of processing cells logically organized in the same number of columns as the pixel array but a reduced number of rows, the method comprising detecting the presence of an event in the transferred analog pixel information of pixels of one or more columns of the subgroup thereby looking to the presence of a hit at column level and not for each individual pixel, in a first step, and to process only those columns which are hit by an event, in a second step,
wherein the pixels of the pixel array have a size smaller than 50 μm.

11. Method according to claim 10, wherein detecting the one or more events comprises determining the center of gravity of the event.

12. An imaging system for detecting one or more sparse events, wherein an event results in one pixel being hit or a plurality of adjacent pixels being hit, in a pixel array comprising pixels logically arranged in rows and columns, the imaging system comprising the pixel array and a processing area adjacent to the pixel array, the processing area comprising a plurality of processing cells logically organized in the same number of columns as the pixel array but a reduced number of rows, wherein the imaging system is configured to transfer analog pixel information of a subgroup of pixels of the pixel array to a same number of processing cells in the processing area and wherein the processing area is configured to digitize and process the event's information present in the transferred analog pixel information, wherein the processing area is configured to detect the presence of an event in the transferred analog pixel information of pixels of one or more columns of the subgroup, thereby looking to the presence of a hit at column level and not for each individual pixel in a first step, and to process only those columns which are hit, in a second step;
the imaging system further comprising an external processing unit, wherein the imaging system is configured for transferring part of the information of the subgroup to the external processing unit;
wherein the processing area comprises a cell per pixel of the subgroup, wherein the cell comprises a sense amplifier, logic and switches; and
wherein the pixels of the pixel array have a size smaller than 10 μm.

* * * * *